(12) United States Patent
Shiraishi et al.

(10) Patent No.: US 7,782,502 B2
(45) Date of Patent: Aug. 24, 2010

(54) IMAGE READING DEVICE AND READING-CHARACTERISTIC CORRECTION METHOD FOR IMAGE READING DEVICE

(75) Inventors: Mitsuo Shiraishi, Toride (JP); Daisuke Morikawa, Abiko (JP)

(73) Assignee: Canon Kabushiki Kaisha, Tokyo (JP)

(*) Notice: Subject to any disclaimer, the term of this patent is extended or adjusted under 35 U.S.C. 154(b) by 108 days.

(21) Appl. No.: 12/130,621

(22) Filed: May 30, 2008

(65) Prior Publication Data
US 2009/0034001 A1 Feb. 5, 2009

(30) Foreign Application Priority Data
May 31, 2007 (JP) ............... 2007-145451

(51) Int. Cl.
*H04N 1/04* (2006.01)
(52) U.S. Cl. .............. 358/474; 358/1.9; 358/2.1; 358/518; 358/505; 399/17; 399/24; 341/120; 341/139
(58) Field of Classification Search ........... 358/1.9, 358/2.1, 1.3, 521, 518, 461, 296, 401, 443, 358/449, 474; 250/208.1, 234; 341/120, 341/139; 399/17, 24, 374
See application file for complete search history.

(56) References Cited

U.S. PATENT DOCUMENTS

| 3,053,405 | A | * | 9/1962 | Holmberg, Jr. et al. ....... 414/607 |
| 4,743,974 | A | * | 5/1988 | Lockwood ................. 358/494 |
| 5,014,123 | A | * | 5/1991 | Imoto ..................... 358/506 |
| 5,646,744 | A | * | 7/1997 | Knox ..................... 358/401 |
| 5,832,137 | A | * | 11/1998 | Knox ..................... 382/275 |
| 6,101,283 | A | * | 8/2000 | Knox ..................... 382/254 |
| 6,631,207 | B2 | * | 10/2003 | Hirota et al. ............... 382/167 |
| 6,734,899 | B1 | | 5/2004 | Okamoto |
| 6,985,251 | B2 | * | 1/2006 | Okahashi et al. ............. 358/1.3 |
| 7,385,711 | B2 | * | 6/2008 | Watanabe ................. 358/1.12 |
| 2001/0030278 | A1 | * | 10/2001 | Koshimizu ............... 250/208.1 |
| 2001/0055120 | A1 | * | 12/2001 | Sawada et al. ............. 358/1.9 |
| 2004/0085439 | A1 | * | 5/2004 | Takaki ................... 347/247 |
| 2005/0024246 | A1 | * | 2/2005 | Fujihara et al. ............ 341/120 |
| 2005/0157319 | A1 | | 7/2005 | Mizuhashi et al. |
| 2005/0206968 | A1 | * | 9/2005 | Sodeura et al. ............. 358/474 |
| 2006/0015534 | A1 | * | 1/2006 | Takahashi ............... 707/104.1 |
| 2008/0068682 | A1 | * | 3/2008 | Morikawa ................. 358/521 |
| 2008/0130064 | A1 | * | 6/2008 | Sato ..................... 358/474 |

(Continued)

FOREIGN PATENT DOCUMENTS

JP 11-069186 A 3/1999

(Continued)

*Primary Examiner*—Negussie Worku
(74) *Attorney, Agent, or Firm*—Canon U.S.A., Inc. I.P. Division

(57) ABSTRACT

Gains and offsets of the input-output characteristic of a second side reading unit are controlled so as to match input-output characteristic of a first side reading unit on the basis of image data of a gray chart read by the first side reading unit and the second side reading unit. Then, on the basis of image data of a color chart read by the first side reading unit and the second side reading unit, offsets of the input-output characteristic of the second side reading unit are controlled for individual color components such that differences between color read by the first side reading unit and color read by the second side reading unit are reduced.

14 Claims, 17 Drawing Sheets

U.S. PATENT DOCUMENTS

2009/0161185 A1 * 6/2009 Hashizume ................. 358/518

FOREIGN PATENT DOCUMENTS

| | | |
|---|---|---|
| JP | 2000-092324 A | 3/2000 |
| JP | 2004-187144 A | 7/2004 |
| JP | 2005-210268 A | 8/2005 |
| JP | 2006-229466 A | 8/2006 |

* cited by examiner

FIG. 7

| DENSITY | REFLECTANCE | LEFT | | | CENTER | | | RIGHT | | | AVERAGE | | |
|---|---|---|---|---|---|---|---|---|---|---|---|---|---|
| | | RED | GREEN | BLUE | RED | GREEN | BLUE | RED | GREEN | BLUE | RED (AVERAGE) | GREEN (AVERAGE) | BLUE (AVERAGE) |
| 0.07 | 0.91 | 251.5 | 249.1 | 238.9 | 253.0 | 251.2 | 241.4 | 251.4 | 248.9 | 238.7 | 252.0 | 249.7 | 239.7 |
| 0.15 | 0.71 | 212.1 | 207.4 | 197.9 | 214.3 | 209.4 | 199.9 | 212.4 | 207.8 | 198.3 | 212.9 | 208.2 | 198.7 |
| 0.45 | 0.36 | 99.1 | 95.3 | 89.9 | 100.2 | 96.2 | 90.8 | 99.7 | 96 | 90.4 | 99.7 | 95.8 | 90.4 |
| 0.79 | 0.16 | 46.7 | 44.0 | 41.7 | 47.3 | 44.4 | 42.1 | 46.3 | 43.8 | 41.6 | 46.8 | 44.1 | 41.8 |
| 1.28 | 0.05 | 15.4 | 13.6 | 12.6 | 15.5 | 13.6 | 12.6 | 15.2 | 13.7 | 12.8 | 15.4 | 13.6 | 12.7 |
| 1.79 | 0.02 | 5.7 | 5.2 | 5.4 | 5.8 | 5.2 | 5.3 | 5.3 | 5.1 | 5.2 | 5.6 | 5.2 | 5.3 |

FIG. 15A

| COLOR PATCH | REFLECTANCE | FRONT-SIDE AVERAGE | | | BACK-SIDE AVERAGE | | |
|---|---|---|---|---|---|---|---|
| | | RED | GREEN | BLUE | RED | GREEN | BLUE |
| RED | 0.22 | 185.3 | 14.8 | 14.1 | 190.9 | 11.7 | 9.2 |
| GREEN | 0.14 | 15.6 | 54.7 | 25.9 | 11.8 | 56.2 | 25.7 |
| BLUE | 0.03 | 17.2 | 15.6 | 49.1 | 12.8 | 10.1 | 48.4 |
| LIGHT BLUE | 0.17 | 19.5 | 75.7 | 169.9 | 14.7 | 65.9 | 172.5 |
| PINK | 0.22 | 194.7 | 17.7 | 46.3 | 197.9 | 11.6 | 42.7 |
| YELLOW | 0.78 | 234.6 | 203.6 | 17.1 | 238.8 | 225.9 | 16.0 |
| ORANGE | 0.58 | 208.5 | 112.2 | 16.8 | 211.9 | 121.1 | 14.4 |

FIG. 15B

| DIFFERENCE IN BRIGHTNESS, BETWEEN FRONT SIDE AND BACK SIDE, OF LOW-BRIGHTNESS COMPONENT OF COLOR PATCH | | |
|---|---|---|
| Rd | Gd | Bd |
| | 3.1 | 4.9 |
| 3.9 | | |
| 4.4 | 5.4 | |
| 4.8 | | |
| | 6.1 | |
| | | 1.0 |
| | | 2.4 |

FIG. 15C

| AVERAGE AMONG PATCHES | 4.4 | 4.9 | 2.8 |
|---|---|---|---|
| AVERAGE/2 | 2.2 | 2.4 | 1.4 |
| WITHIN RANGE BETWEEN UPPER LIMIT AND LOWER LIMIT | 2.0 | 2.0 | 1.4 |

FIG. 16A

| COLOR PATCH | REFLECTANCE | FRONT-SIDE AVERAGE | | | BACK-SIDE AVERAGE | | |
|---|---|---|---|---|---|---|---|
| | | RED | GREEN | BLUE | RED | GREEN | BLUE |
| RED | 0.22 | 185.3 | 14.8 | 14.1 | 195.2 | 16.6 | 12.0 |
| GREEN | 0.14 | 15.6 | 54.7 | 25.9 | 16.1 | 61.1 | 28.5 |
| BLUE | 0.03 | 17.2 | 15.6 | 49.1 | 17.2 | 15.0 | 51.2 |
| LIGHT BLUE | 0.17 | 19.5 | 75.7 | 169.9 | 19.0 | 70.8 | 175.2 |
| PINK | 0.22 | 194.7 | 17.7 | 46.3 | 202.3 | 16.5 | 45.4 |
| YELLOW | 0.78 | 234.6 | 203.6 | 17.1 | 243.1 | 230.8 | 18.8 |
| ORANGE | 0.58 | 208.5 | 112.2 | 16.8 | 216.3 | 126.0 | 17.1 |

FIG. 16B

| DIFFERENCE IN BRIGHTNESS, BETWEEN FRONT SIDE AND BACK SIDE, OF LOW-BRIGHTNESS COMPONENT OF COLOR PATCH | | |
|---|---|---|
| Rd | Gd | Bd |
| | −1.8 | 2.1 |
| −0.5 | | |
| 0.0 | 0.5 | |
| 0.5 | | |
| | 1.3 | |
| | | −1.8 |
| | | −0.4 |

IMAGE READING DEVICE AND READING-CHARACTERISTIC CORRECTION METHOD FOR IMAGE READING DEVICE

BACKGROUND OF THE INVENTION

1. Field of the Invention

The present invention relates to image reading devices for reading a first side and a second side of an original using different reading units and reading-characteristic correction methods for the image reading devices.

2. Description of the Related Art

An image reading device provided in a copying machine and configured to, in order to improve productivity, read the front and back sides of an original using a front-side reading unit and a back-side reading unit without inverting the original front-to-back is known (see, for example, Japanese Patent Laid-Open No. 2004-187144).

Such an image reading device reads the front and back sides of an original using different reading units. Thus, in a case where portions having the same image density are read using the front-side reading unit and the back-side reading unit, a difference in reading level may occur between the front-side reading unit and the back-side reading unit. In such a case, reproduced color and density may be different between the front side and the back side of the original.

A method for performing image correction such that the density of image data read by a front-side reading unit and the density of image data read by a back-side reading unit are matched by using a unit configured to correct a difference in reading level between the front-side reading unit and the back-side reading unit is available (see, for example, Japanese Patent Laid-Open No. 2005-210268).

In addition, a method for reading an adjustment original using a first reading unit and a second reading unit and determining gamma correction tables and color correction factors such that values of color components read by the first reading unit and values of the corresponding color components read by the second reading unit are matched is available (see, for example, Japanese Patent Laid-Open No. 2006-229466).

In the method described in Japanese Patent Laid-Open No. 2005-210268, in the case of a monochrome image, the image densities of the front and back sides are matched. However, in the case of a color image, correction of a difference in image color between the front and back sides cannot be sufficiently performed in this method. That is, even if the image densities of the front and back sides can be matched in the case of a monochrome image, color tones of the front and back sides may not be the same in the case of a color image. In particular, a difference in color tone between a low-brightness portion on the front side and a low-brightness portion on the back side tends to be noticeable.

In the method described in Japanese Patent Laid-Open No. 2006-229466, the color tone of a portion read by the first reading unit and the color tone of a portion read by the second reading unit can be matched. However, since a memory for generating gamma correction tables is necessary, the circuit scale is increased and the cost is also increased.

SUMMARY OF THE INVENTION

According to an aspect of the present invention, a reading-characteristic correction method for an image reading device including a first reading unit configured to read a first side of an original and a second reading unit configured to read a second side of the original includes: receiving image data of a monochrome reference original read by the first reading unit and the second reading unit; correcting a relative relationship between tone characteristic of the first reading unit and tone characteristic of the second reading unit based on the image data of the monochrome reference original; receiving image data of a color reference original read by the first reading unit and the second reading unit; and correcting the relative relationship between the tone characteristic of the first reading unit and the tone characteristic of the second reading unit based on the image data of the color reference original.

According to another aspect of the present invention, a reading-characteristic correction method for an image reading device including a first reading unit configured to read a first side of an original and a second reading unit configured to read a second side of the original includes: causing the first reading unit and the second reading unit to read a monochrome reference original; correcting gains and offsets of the input-output characteristic of the second reading unit, based on image data of the monochrome reference original read by the first reading unit and the second reading unit, such that the input-output characteristic of the second reading unit matches input-output characteristic of the first reading unit; causing the first reading unit and the second reading unit to read a color reference original; and correcting, for individual color components, the offsets of the input-output characteristic of the second reading unit, based on image data of the color reference original read by the first reading unit and the second reading unit, such that differences between color read by the first reading unit and color read by the second reading unit are reduced.

According to another aspect of the present invention, an image reading device includes: a first reading unit configured to read a first side of an original; a second reading unit configured to read a second side of the original; and a correction unit configured to correct a relative relationship between tone characteristic of the first reading unit and tone characteristic of the second reading unit based on image data of a monochrome reference original and to correct the relative relationship between the tone characteristic of the first reading unit and the tone characteristic of the second reading unit based on image data of a color reference original.

According to another aspect of the present invention, an image reading device includes: a first reading unit configured to read a first side of an original; a second reading unit configured to read a second side of the original; and a correction unit configured to correct, for individual color components, slopes and intercepts of input-output characteristic of the second reading unit. The correction unit corrects the slopes and the intercepts of the input-output characteristic of the second reading unit, based on image data of a monochrome reference original read by the first reading unit and the second reading unit, such that the input-output characteristic of the second reading unit matches input-output characteristic of the first reading unit, and corrects, for individual color components, the intercepts of the input-output characteristic of the second reading unit, based on image data of a color reference original read by the first reading unit and the second reading unit, such that differences between color read by the first reading unit and color read by the second reading unit are reduced.

Further features of the present invention will become apparent from the following description of exemplary embodiments with reference to the attached drawings.

BRIEF DESCRIPTION OF THE DRAWINGS

FIG. 7 is a table representing read brightnesses of grayscale patches of the gray chart and the averages of the read brightnesses in a main-scanning direction.

FIGS. 15A to 15C are tables showing specific examples of values read from the correction color chart shown in FIG. 13.

FIGS. 16A to 16B are tables showing specific examples of differences in brightness between the front and back sides after the difference averages shown in FIG. 15C are added as offset values to the read data for the back side shown in FIG. 15B.

DESCRIPTION OF THE EMBODIMENTS

An image reading device and a reading-characteristic correction method for the image reading device according to embodiments of the present invention will be described with reference to the drawings.

Figure 1:
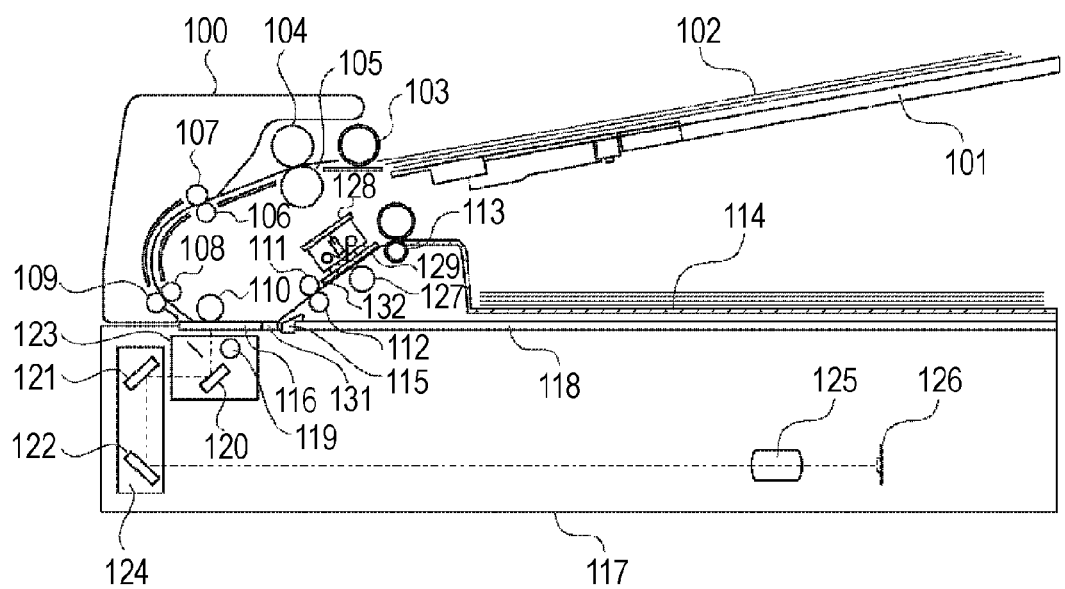
FIG. 1 is a sectional view of an image reading device according to an embodiment of the present invention.

FIG. 1 shows the configuration of an image reading device 117 according to an embodiment of the present invention. Reference numeral 100 denotes an original-feeding device. An original 102 is placed on an original tray 101. A feed roller 103 is provided above the original tray 101. The feed roller 103 feeds the original 102 that is placed on the original tray 101. Since the feed roller 103 is rotatably supported by an arm (not shown), swing motion of the arm allows the feed roller 103 to be moved upward and downward. Upon starting the feed operation, the feed roller 103 is lowered to be in contact with the front side of the original 102.

A roller 105 is located so as to face a separation roller 104 and is pushed toward the separation roller 104. The roller 105 is made of a rubber material or the like having a friction that is slightly lower than that of the separation roller 104. In cooperation with the separation roller 104, the roller 105 feeds, one by one, the original 102 fed by the feed roller 103.

The original separated by the separation roller 104 impinges against nip portions of stationary registration rollers 106 and 107, and the position of a leading edge of the original is adjusted. A lead roller 108 and a driven roller 109 convey the original 102 toward a flow-reading glass 116. A platen roller 110 is located so as to face the flow-reading glass 116.

A charge-coupled device (CCD) line sensor (hereinafter, simply referred to as a CCD) 126 reads an image on a front side (a first side) of the original 102 conveyed on the flow-reading glass 116. After the image on the front side of the original 102 is read by the CCD 126, the original 102 is conveyed by a lead roller 111 and a driven roller 112 toward a contact image sensor (CIS) 128. A jump platform 115 picks up a sheet on the flow-reading glass 116. A platen roller 127 is located so as to face the CIS 128.

The CIS 128 reads image information on a back side (a second side) of the original 102 conveyed on a flow-reading glass 129. After the image on the back side of the original 102 is read by the CIS 128, the original 102 is output to an output tray 114 by an output roller 113.

The image reading device 117 includes a lamp 119 that applies light to a side of the original 102 to be read and mirrors 120, 121, and 122 for guiding light reflected from the original 102 to the CCD 126. The lamp 119 and the mirror 120 are provided on a first mirror carriage 123. The mirrors 121 and 122 are provided on a second mirror carriage 124.

The mirror carriages 123 and 124 are coupled to a driving motor (not shown) through wires (not shown). In accordance with rotation of the driving motor, each of the mirror carriages 123 and 124 moves in parallel with an original plate glass 118. Light reflected from the original 102 is guided through the mirrors 120, 121, and 122 to a lens 125, and an image is formed, by the lens 125, on a photo detector of the CCD 126. The CCD 126 performs photoelectric conversion of the reflected light and outputs an electric signal (analog signal) corresponding to an incident light quantity.

A photo detector of the CIS 128 performs photoelectric conversion of the light reflected from the original 102, and outputs an electric signal (analog signal) corresponding to an incident light quantity.

The image reading device having the above-described configuration has an original fixed-reading mode and an original flow-reading mode. In the original fixed-reading mode, when the first mirror carriage 123 and the second mirror carriage 124 are moved in a sub-scanning direction (in a horizontal direction in FIG. 1), the original 102 placed on the original plate glass 118 is read. In the original flow-reading mode, when the original-feeding device 100 feeds the original 102 in a state where the first mirror carriage 123 and the second mirror carriage 124 remain stationary, the original 102 placed on the flow-reading glass 116 is read. In the original flow-reading mode, an image on the back side of the original 102 is also read by the CIS 128 through the flow-reading glass 129.

Figure 2:
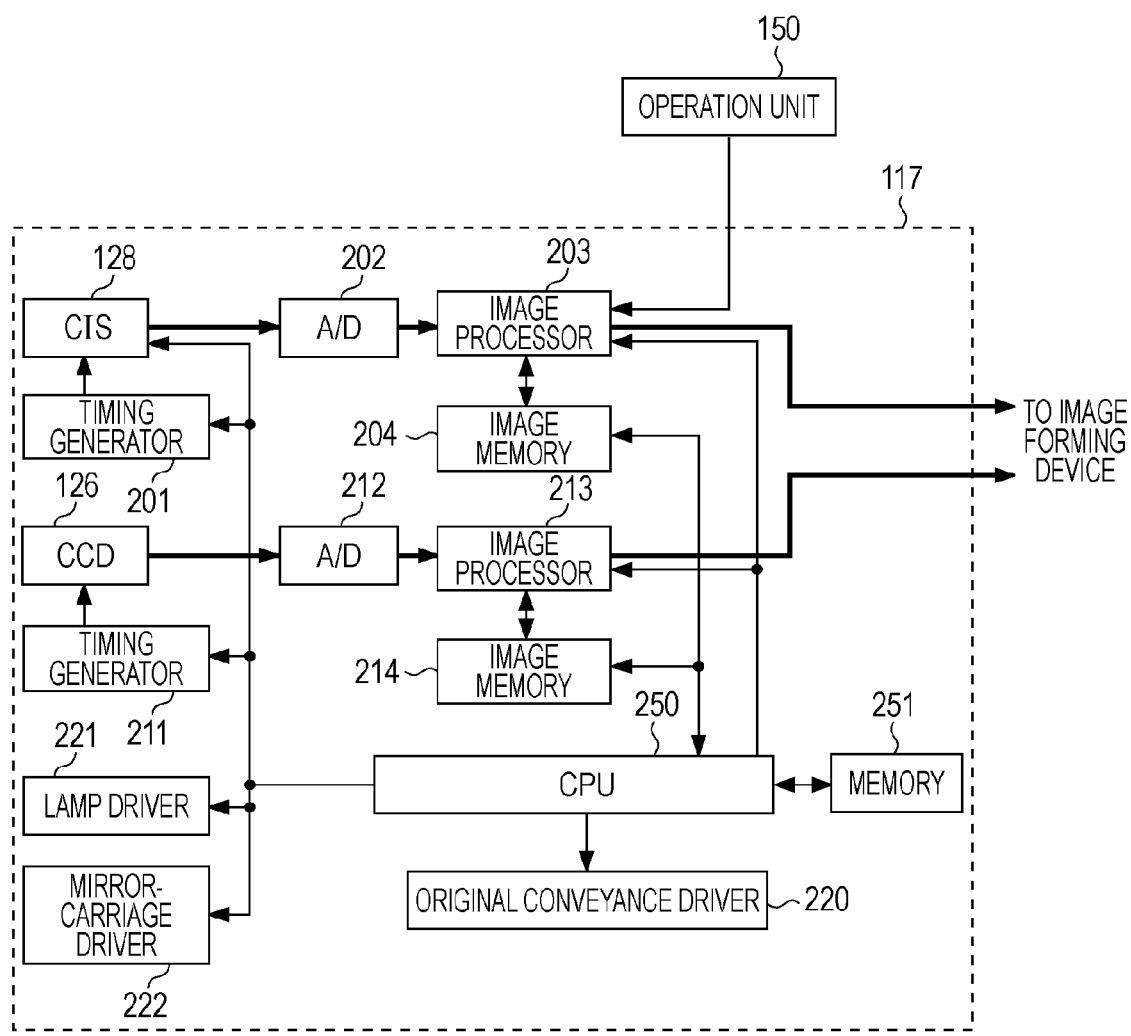
FIG. 2 is a block diagram showing the image reading device according to the embodiment.

FIG. 2 is a block diagram showing an image reading device according to this embodiment. Timing generators 211 and 201 supply reading timing signals to the CCD 126 and the CIS 128, respectively. An analog signal output from the CCD 126 is converted into a digital signal by an analog-to-digital (A/D) converter 212. A digital signal (image data) output from the A/D converter 212 is subjected to image processing, such as shading correction, by an image processor 213. Image data to be subjected to image processing by the image processor 213 and image data that has been subjected to image processing by the image processor 213 are temporarily stored in an image memory 214. Image data that has been subjected to image processing by the image processor 213 is transmitted to an image forming device (not shown). The image forming device forms, in accordance with an electrophotography method or an inkjet method, on a sheet an image based on image data received from the image reading device 117.

Figure 3:
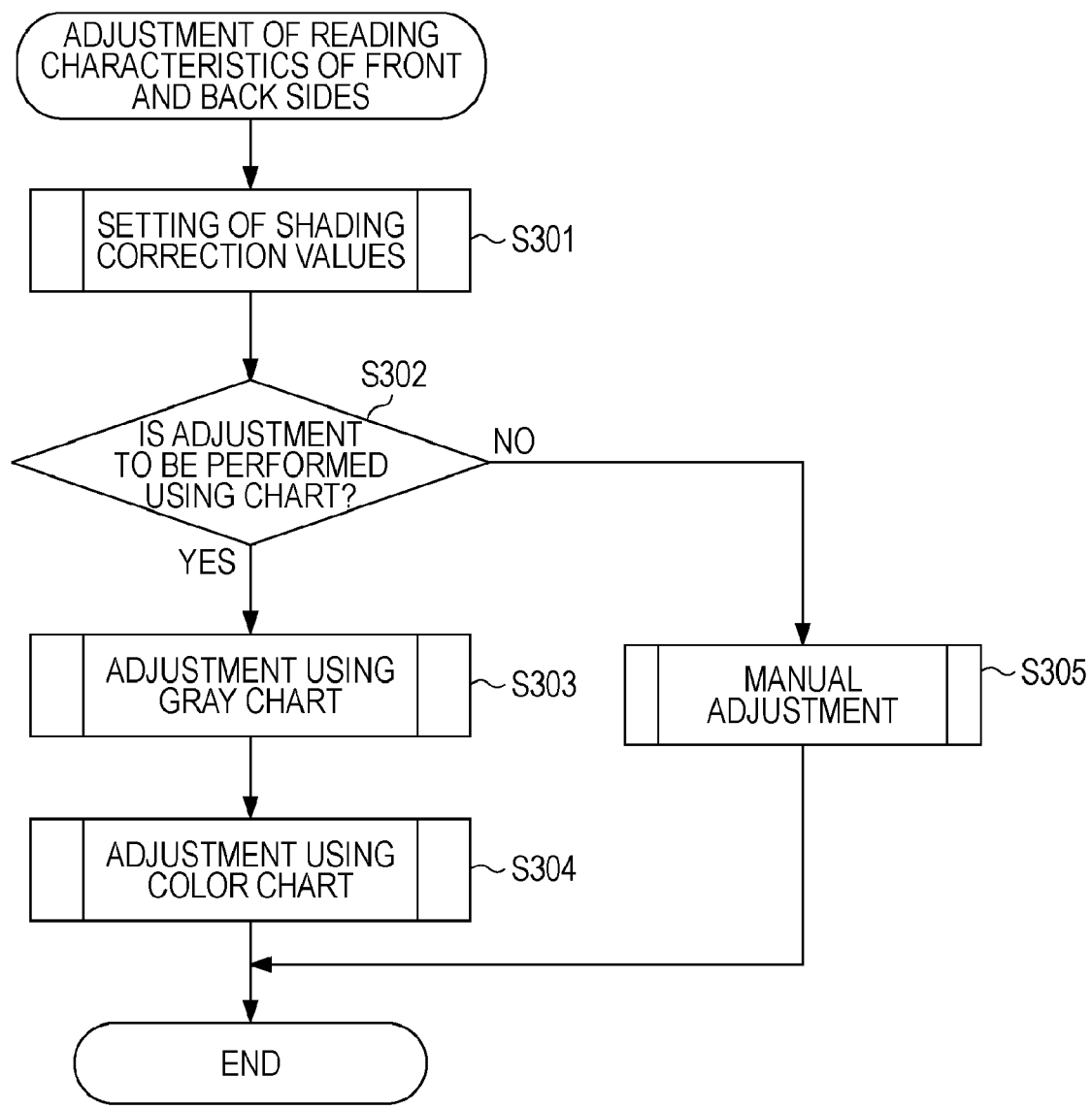
FIG. 3 is a flowchart showing an adjustment process for the reading characteristic of a front-side reading unit and the reading characteristic of a back-side reading unit.
Figure 4:
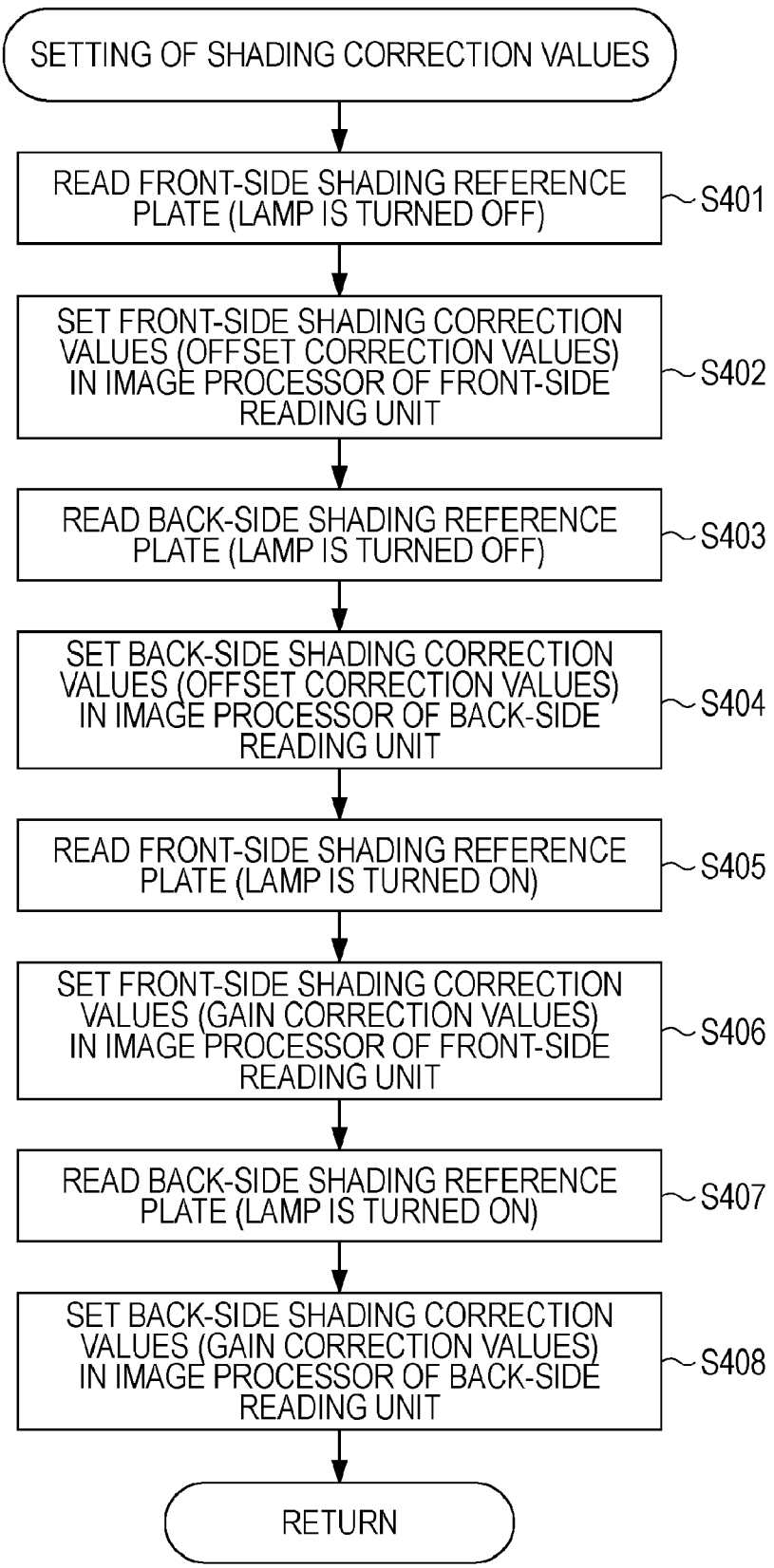
FIG. 4 is a flowchart showing processing for setting shading correction values.
Figure 5:
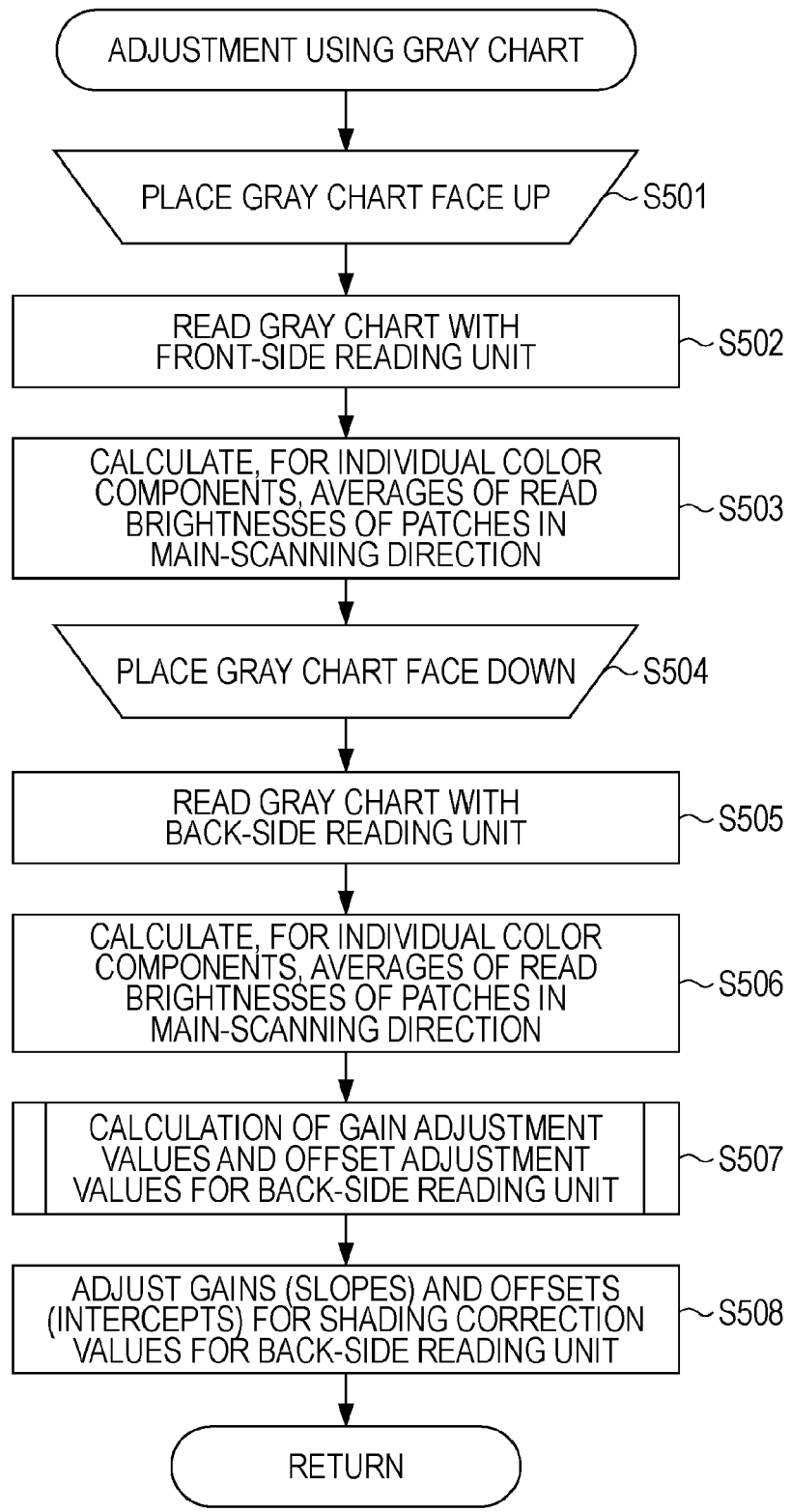
FIG. 5 is a flowchart showing processing for adjusting the front and back sides using a gray chart.
Figure 12:
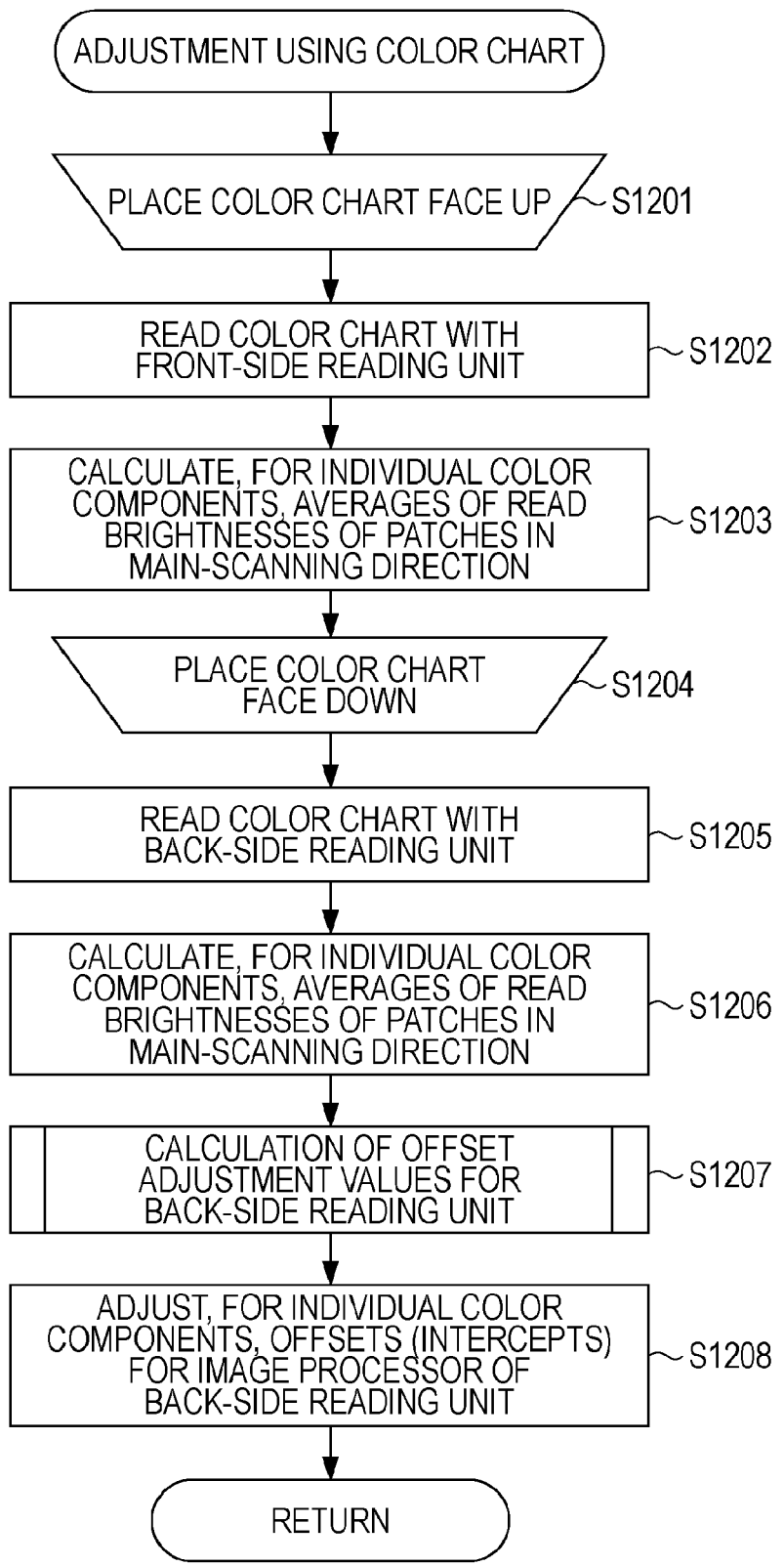
FIG. 12 is a flowchart showing processing for adjusting the front and back sides using a color chart.
Figure 18:
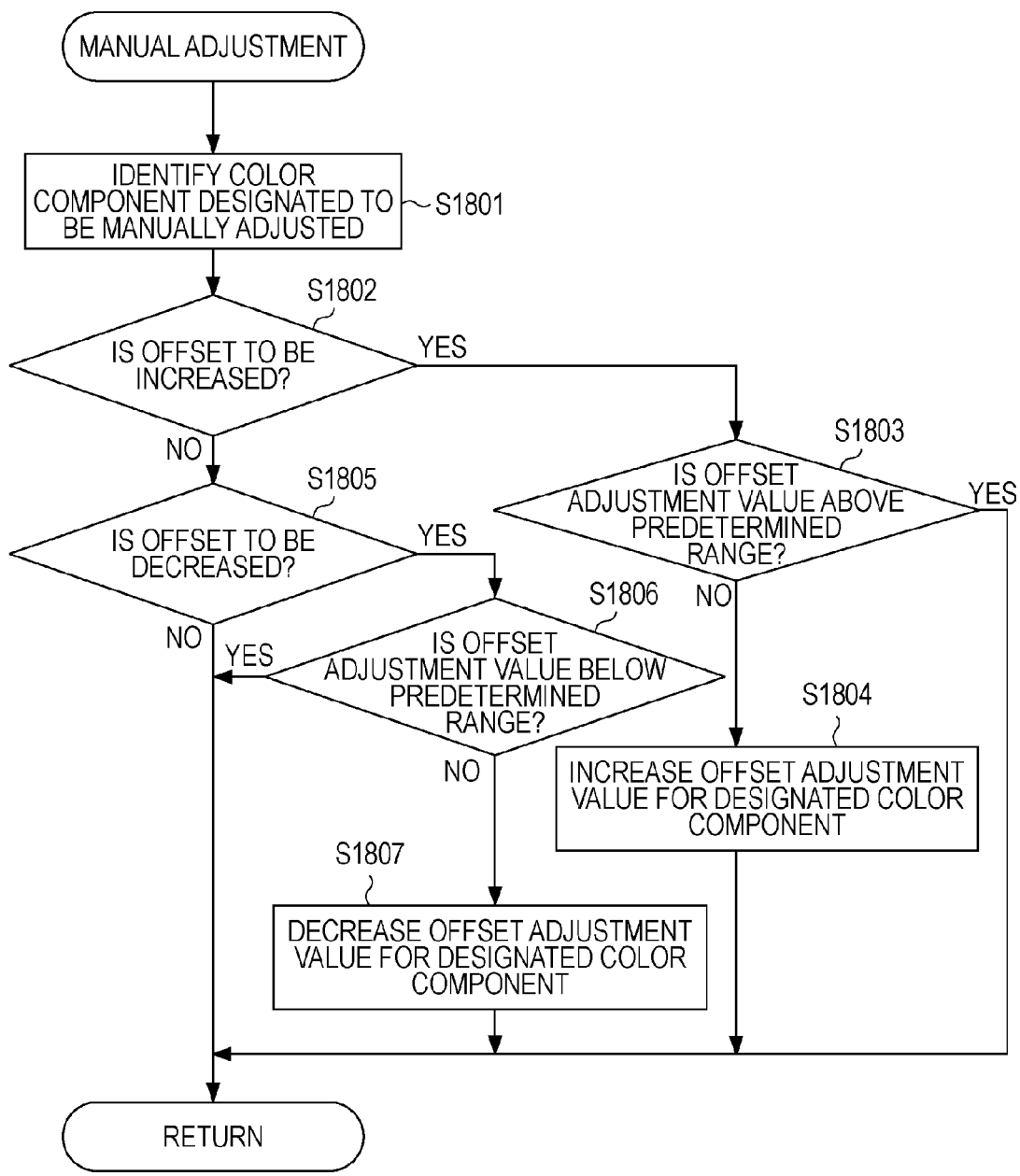
FIG. 18 is a flowchart showing processing for performing manual adjustment.

FIG. 3 is a flowchart showing an adjustment process for the reading characteristic of a front-side reading unit and the reading characteristic of a back-side reading unit. A central processing unit (CPU) 250 performs setting of shading correction values (step S301). FIG. 4, described below, illustrates details of step S301. The CPU 250 determines whether adjustment for the front and back sides is to be performed using a chart (step S302). If it is determined in step S302 that adjustment for the front and back sides is to be performed using a chart (YES in step S302), the CPU 250 performs adjustment for the front and back sides using a gray chart (step S303). FIG. 5, described below, illustrates details of step S303. Then, the CPU 250 performs adjustment for the front and back sides using a color chart (step S304). FIG. 12, described below, illustrates details of step S304. Then, the adjustment process for the front and back sides is terminated. If it is determined in step S302 that adjustment for the front and back sides is to be performed not using a chart (NO in step S302), the CPU 250 performs manual adjustment (step S305). FIG. 18, described below, illustrates details of step S305. Then, the adjustment process for the front and back sides is terminated.

Setting of shading correction values for the CCD 126 and the CIS 128 to be performed in step S301 of FIG. 3 will be described with reference to a flowchart shown in FIG. 4. Shading correction is processing for correcting reading variations in a main-scanning direction of the CCD 126 and the CIS 128.

The CPU 250 controls a mirror-carriage driver 222 to move the first mirror carriage 123 to the position of a shading reference plate 131. In a state where the lamp 119 is turned off, the CCD 126 reads the shading reference plate 131 (step S401). An image signal from the CCD 126 is temporarily stored as image data in the image memory 214 through the A/D converter 212 and the image processor 213. The CPU 250 determines offset correction values for shading correction for the CCD 126 on the basis of the data read at this time, and sets the offset correction values in the image processor 213 (step S402). The offset correction values are values for individual pixels of the CCD 126, each of the values being obtained such that image data after the shading correction at the time when the lamp is turned off is performed is equal to a first predetermined value (for example, a brightness of 5).

Then, in a state where the CPU 250 turns off a lamp contained in the CIS 128, the CIS 128 reads a shading reference plate 132 (step S403). An image signal from the CIS 128 is temporarily stored as image data in an image memory 204 through an A/D converter 202 and an image processor 203. Similarly to the shading correction data for the CCD 126, the CPU 250 determines offset correction values for shading correction for the CIS 128 on the basis of the data read at this time, and sets the offset correction values in the image processor 203 (step S404).

Then, the CPU 250 controls a lamp driver 221 to turn on the lamp 119, and the CCD 126 reads light reflected from the shading reference plate 131 (step S405). An image signal from the CCD 126 is temporarily stored as image data in the image memory 214 through the A/D converter 212 and the image processor 213. The CPU 250 determines gain correction values for shading correction for the CCD 126 on the basis of the read data based on the shading reference plate 131, and sets the gain correction values in the image processor 213 (step S406). The gain correction values are values for individual pixels of the CCD 126, each of the values being obtained such that image data after the shading correction at the time when the CCD 126 reads the shading reference plate 131 is performed is equal to a second predetermined value (for example, a brightness of 245).

Then, the CPU 250 turns on the light source contained in the CIS 128 and moves the flow-reading glass 129 in a direction in which the original 102 is conveyed, so that the shading reference plate 132 provided on the flow-reading glass 129 is moved to a reading position of the CIS 128. The CIS 128 reads light reflected from the shading reference plate 132 (step S407). An image signal from the CIS 128 is temporarily stored as image data in the image memory 204 through the A/D converter 202 and the image processor 203. Similarly to the shading correction data for the CCD 126, the CPU 250 determines gain correction values for shading correction for the CIS 128 on the basis of the read data based on the shading reference plate 132, and sets the gain correction values in the image processor 203 (step S408). Processing then returns to FIG. 3.

Then, the image processors 213 and 203 perform, for image data of an original image output from the CCD 126 and the CIS 128, shading correction involving gain adjustment and offset adjustment set for individual pixels by the CPU 250.

As described above, shading correction is performed for image data output from the CCD 126 configured to read a front-side image of an original and for image data output from the CIS 128 configured to read a back-side image of the original.

Figure 6:
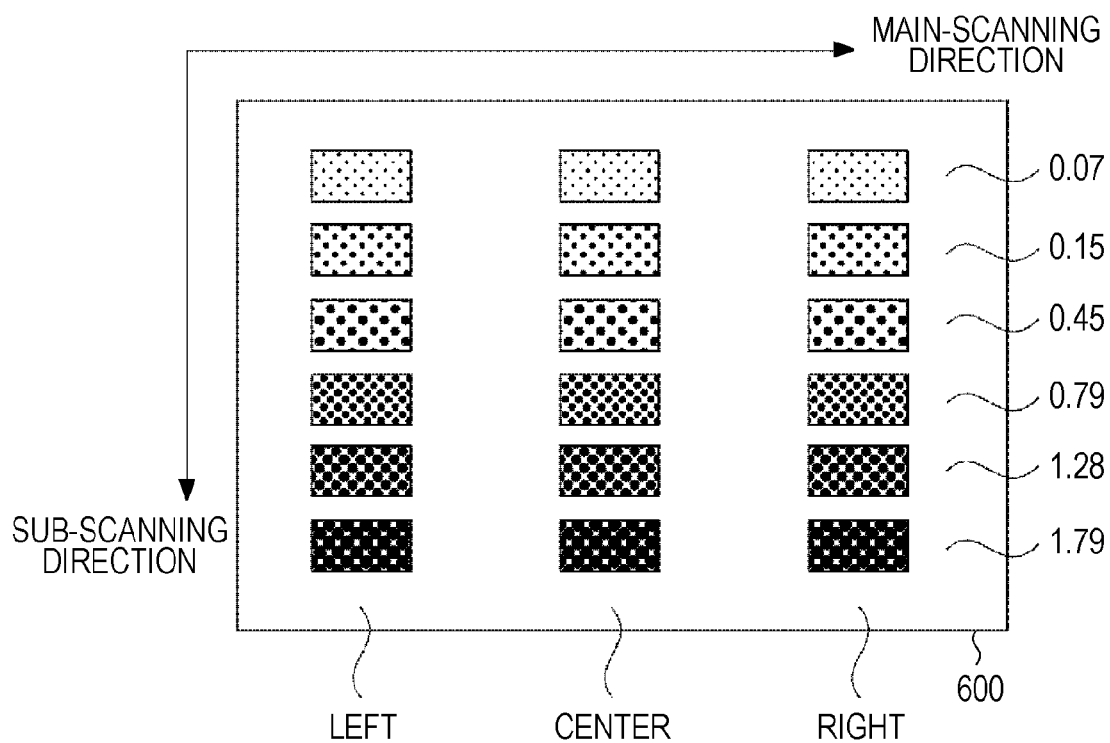
FIG. 6 shows an example of the gray chart.

Adjustment for the front and back sides using a gray chart (monochrome reference original) to be performed in step S303 of FIG. 3 will now be described with reference to a flowchart shown in FIG. 5. An adjustment operator places a gray chart 600 face up on the original tray 101 such that the gray chart 600 is fed in a sub-scanning direction shown in FIG. 6 (step S501). The gray chart 600 includes a plurality of grayscale patches having at least two different reflectances, as shown in FIG. 6. Densities of the patches constituting the gray chart 600 are constant in a main-scanning direction. Although the gray chart 600 includes a plurality of grayscale patches in this example, the gray chart 600 does not necessarily include grayscale patches. The gray chart 600 may include any type of images, such as band-shaped images, as long as the images are grayscale images having a plurality of grayscale levels.

The CPU 250 controls an original conveyance driver 220 of the original-feeding device 100 to feed the gray chart 600. The CCD 126 (the front-side reading unit, that is, a first reading unit) reads the gray chart 600 (step S502). The read image data of the gray chart 600 is stored in the image memory 214 through the image processor 213. The CPU 250 reads the read brightnesses of the grayscale patches of the gray chart 600 stored in the image memory 214, and stores the read brightnesses in a memory 251.

As shown in FIG. 7, on the basis of the read brightnesses of the grayscale patches stored in the memory 251, the CPU 250 calculates, for individual color components (red, green, and blue), the averages of the read brightnesses of the grayscale patches in the main-scanning direction (left, center, and right) (step S503). In FIG. 7, densities represent measured densities of the grayscale patches, and reflectances represent values defined by equation (1):

$$R = \frac{1}{10}^D \qquad (1),$$

where "R" represents reflectance and "D" represents density.

Then, the adjustment operator places the gray chart 600 face down on the original tray 101 such that the gray chart 600 is fed in the sub-scanning direction shown in FIG. 6 (step S504).

The CPU 250 controls the original conveyance driver 220 of the original-feeding device 100 to feed the gray chart 600. The CIS 128 (the back-side reading unit, that is, a second reading unit) reads the gray chart 600 (step S505). The read image data of the gray chart 600 is stored in the image memory 204 through the image processor 203. The CPU 250 reads the read brightnesses of the grayscale patches of the gray chart 600 stored in the image memory 204, and stores the read brightnesses in the memory 251.

On the basis of the read brightnesses of the grayscale patches stored in the memory 251, the CPU 250 calculates, for individual color components (red, green, and blue), the averages of the read brightnesses of the grayscale patches in the main-scanning direction (left, center, and right), and stores the obtained averages in the memory 251 (step S506).

Then, the CPU 250 calculates gain adjustment values and offset adjustment values for the CIS 128 (the back-side reading unit, that is, the second reading unit) (step S507). The CPU 250 sets the gain adjustment values (slope adjustment values) and the offset adjustment values (intercept adjustment values) for the shading correction values for the CIS 128 in the image processor 203 (step S508). Processing then returns to FIG. 3.

Figure 8:
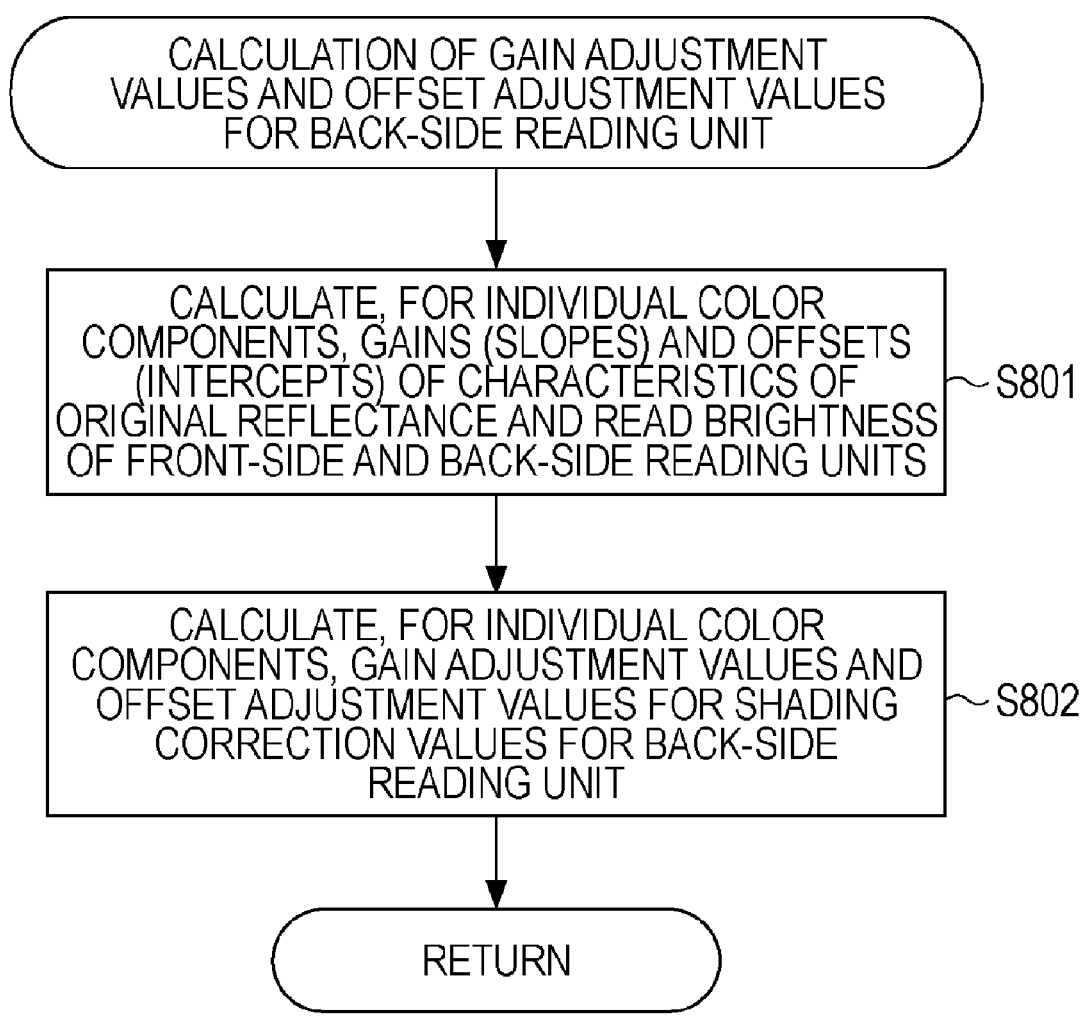
FIG. 8 is a flowchart showing processing for calculating gain adjustment values and offset adjustment values for the back-side reading unit.
Figure 9:
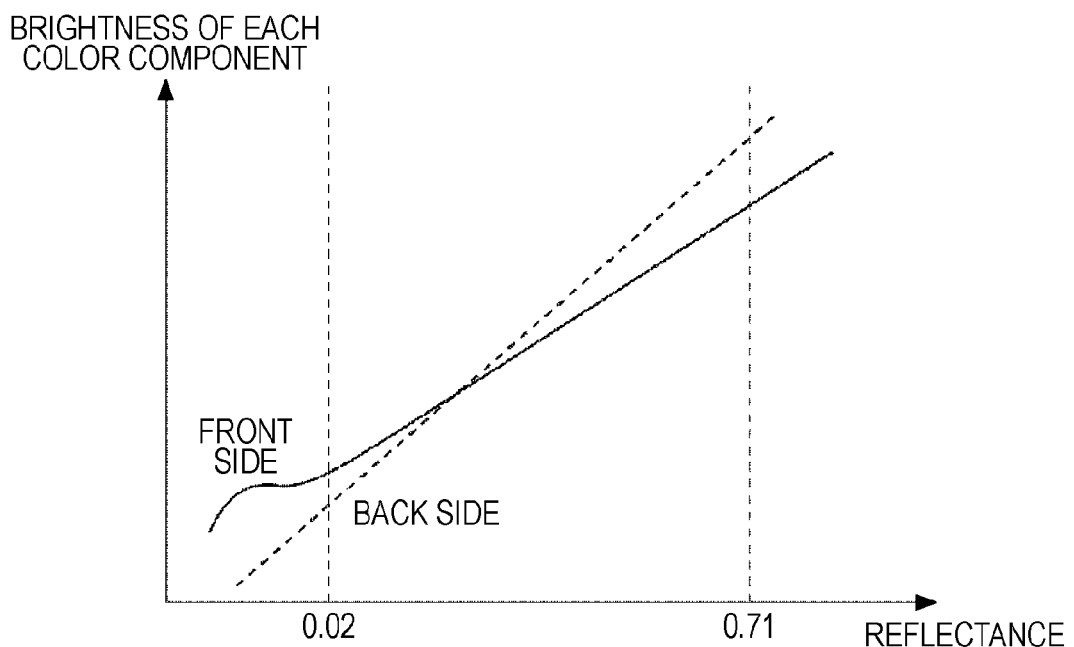
FIG. 9 shows the linearity characteristic of the front-side reading unit and the linearity characteristic of the back-side reading unit before adjustment for the front and back sides using the gray chart is performed.

Calculation of the gain adjustment values and the offset adjustment values for the CIS 128 (the back-side reading unit) to be performed in step S507 will now be described with reference to a flowchart shown in FIG. 8. The shading correction values for the front-side reading unit and the back-side reading unit are set in step S301 of FIG. 3. In this state, however, the reading characteristic of the front-side reading unit and the reading characteristic of the back-side reading unit are independent of each other, as shown in FIG. 9. Thus, the linearity characteristic (that is, input-output characteristic or tone characteristic) of the back-side reading unit are adjusted such that the linearity characteristic of the CCD 126 (the front-side reading unit) and the linearity characteristic of the CIS 128 (the back-side reading unit) are matched. Accordingly, the relative relationship between the tone characteristic when the front-side reading unit reads the gray chart and the tone characteristic when the back-side reading unit reads the gray chart can be corrected.

The CCD 126 is a reduction optical system using a condenser lens, whereas the CIS 128 is an equal-magnification optical system implementing proximity reading. Such a difference in optical systems tends to cause a difference in linearity characteristic. In particular, the linearity of a low-brightness portion (a brightness in the case that a portion of an original that has a low reflectance is read) read by the CCD 126 is slightly different from the linearity of the low-brightness portion read by the CIS 128. This is because since a certain distance (optical path) is required for a reduction optical system to collect light using a condenser lens, little extraneous light, such as flare, enters the optical path, which influences the linearity of the low-brightness portion read by the CCD 126.

Thus, in this embodiment, adjustment for front-side read brightnesses and back-side read brightnesses is performed using a patch having a low density and a patch having a high density from among a plurality of halftone grayscale patches. The two grayscale patches each have a reflectance that can be expressed by linear approximation of input-output characteristic. As represented by the input-output characteristic of the front-side reading unit shown in FIG. 9, although the characteristic in a low-reflectance portion is nonlinear, the other portions can be expressed by linear approximation. Thus, grayscale patches having two different reflectances within a range where reflectances can be expressed by linear approximation are used. Here, linearity correction for the back-side reading unit is performed on the basis of read brightnesses of the front-side reading unit and the back-side reading unit for grayscale patches having a density of 0.15 (a reflectance of 0.71) and a density of 1.79 (a reflectance of 0.02). As described above, the input-output characteristic of the front-side reading unit and the input-output characteristic of the back-side reading unit within a range between the grayscale patches having the two different reflectances are not nonlinear and can be expressed by linear approximation.

First, regarding the front-side reading unit, the CPU 250 reads, for individual color components, the averages of the two grayscale patches (densities of 0.15 and 1.79) stored in the memory 251. Then, on the basis of the read values of the two points, the CPU 250 calculates, for individual color components, slopes and intercepts of the input-output characteristic of the CCD 126 (the front-side reading unit) (step S801). The input-output characteristic (linearity characteristic) of the CCD 126 is used as a reference for matching the linearity characteristic of the front-side reading unit and the linearity characteristic of the back-side reading unit. Then, similarly to the CCD 126, the CPU 250 calculates, for individual color components, slopes and intercepts of the input-output characteristic of the CIS 128 on the basis of the averages of the two grayscale patches (densities of 0.15 and 1.79) for individual color components (step S801).

Figure 10:
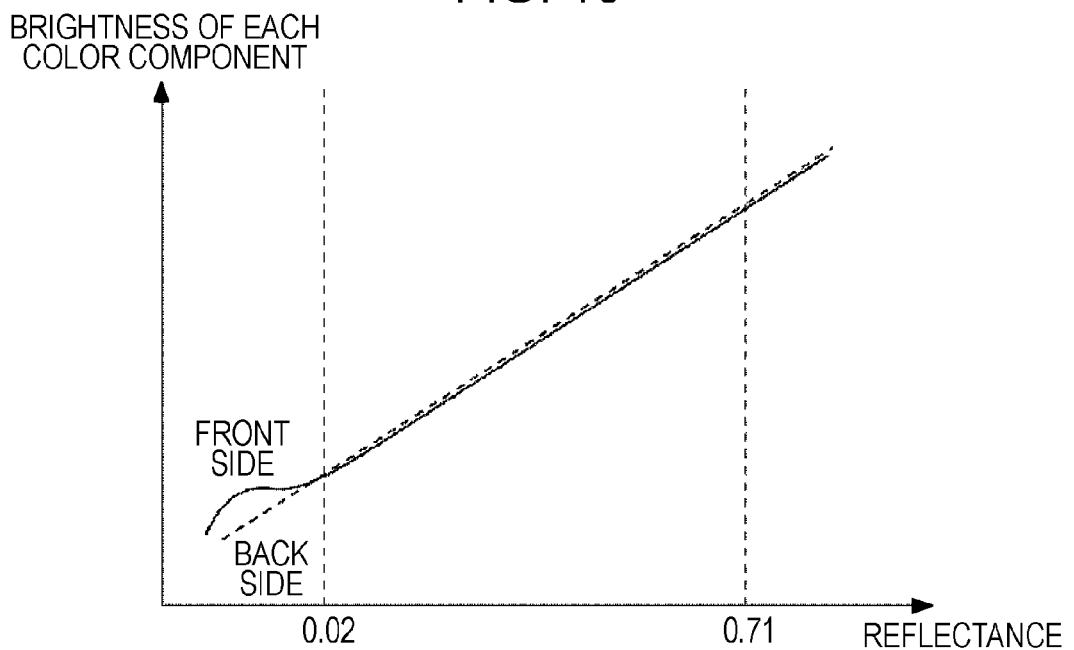
FIG. 10 shows the linearity characteristic of color components of the front-side reading unit and the linearity characteristic of the color components of the back-side reading unit after the adjustment for the front and back sides using the gray chart is performed.
Figure 11:
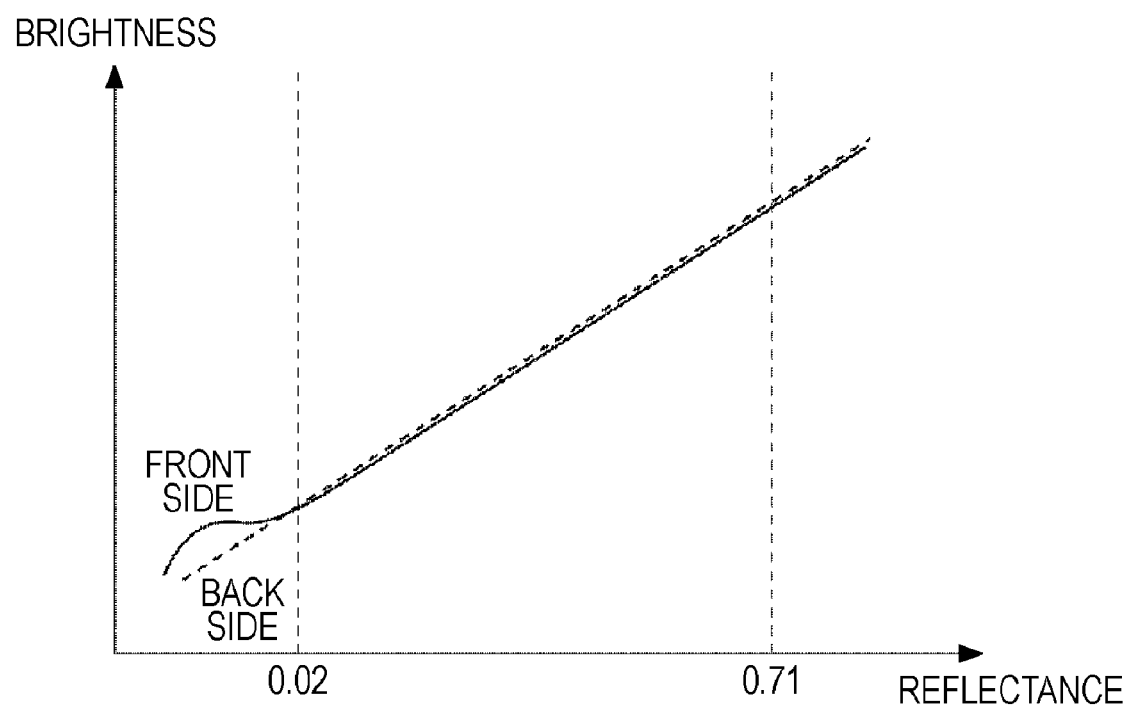
FIG. 11 shows the linearity characteristic of the front-side reading unit and the linearity characteristic of the back-side reading unit after the adjustment for the front and back sides using the gray chart is performed.

Then, as shown in FIG. 10, the CPU 250 calculates, for individual color components, adjustment values (gain adjustment values and offset adjustment values) for shading correction values for the back-side reading unit such that the linearity characteristic of the back-side reading unit for individual color components matches the linearity characteristic of the front-side reading unit for individual color components (step S802). After the CPU 250 calculates the gain adjustment values and the offset adjustment values, the process returns to step S507 of FIG. 5. FIG. 11 shows the input-output characteristic of the front-side reading unit and the input-output characteristic of the back-side reading unit after gain adjustment and offset adjustment for the back-side reading unit are performed for individual color components.

Adjustment for the front and back sides using a color chart to be performed in step S304 of FIG. 3 will now be described with reference to a flowchart shown in FIG. 12. The linearity characteristic of the front-side reading unit and the back-side reading unit are matched by using a gray chart in step S303. In this state, however, in a case where a color image having a low reflectance is read, a color tone read by the front-side reading unit may be different from a color tone read by the back-side reading unit. Thus, in order to reduce the difference between the color tone read by the front-side reading unit and the color tone read by the back-side reading unit in the case that a color image having a low reflectance is read, offset adjustment of the linearity characteristic of the back-side reading unit is performed for individual color components by using a color chart. Accordingly, the relative relationship between the tone characteristic when the front-side reading unit reads the color chart and the tone characteristic when the back-side reading unit reads the color chart can be corrected.

Figure 13:
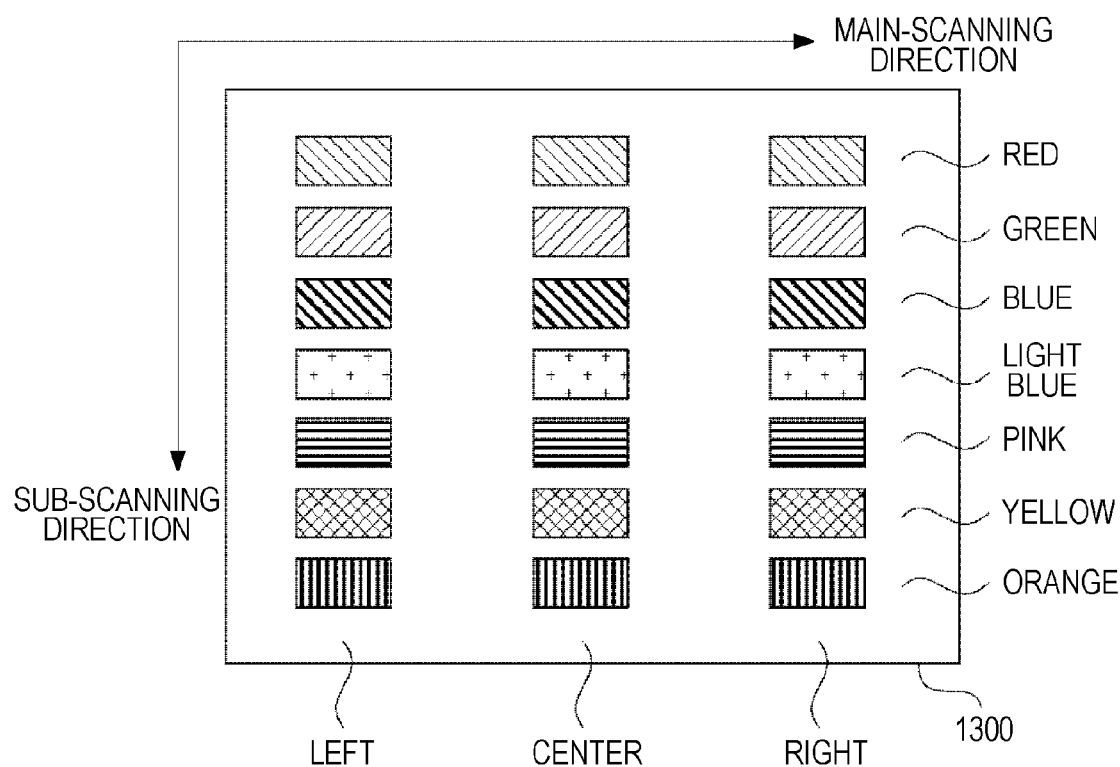
FIG. 13 shows an example of the color chart.

First, the adjustment operator places a color chart (color reference original) 1300 face up on the original tray 101 such that the color chart 1300 is fed in the sub-scanning direction shown in FIG. 6 (step S1201). The color chart 1300 includes color patches of a plurality of colors (red, green, blue, light blue, pink, yellow, and orange), as shown in FIG. 13. A plurality of color patches are arranged uniformly in the main-scanning direction. Although the color chart 1300 includes a plurality of color patches in this example, the color chart 1300 does not necessarily include color patches. The color chart 1300 may include any type of images, such as band-shaped reference color images, as long as the images have different colors.

The CPU 250 controls the original conveyance driver 220 of the original-feeding device 100 to feed the color chart 1300. The CCD 126 (the front-side reading unit, that is, the first reading unit) reads the color chart 1300 (step S1202). The read image data of the color chart 1300 is stored in the image memory 214 through the image processor 213. The CPU 250 reads the read brightnesses of the color patches of the color chart 1300 stored in the image memory 214, and stores the read brightnesses in the memory 251.

As shown in FIG. 15A, on the basis of the read brightnesses of the color patches stored in the memory 251, the CPU 250 calculates, for individual color components (red, green, and blue), the averages of the read brightnesses of the color patches in the main-scanning direction (left, center, and right) (step S1203).

Then, the adjustment operator places the color chart 1300 face down on the original tray 101 such that the color chart 1300 is fed in the sub-scanning direction in FIG. 6 (step S1204).

The CPU 250 controls the original conveyance driver 220 of the original-feeding device 100 to feed the color chart 1300. The CIS 128 (the back-side reading unit, that is, the second reading unit) reads the color chart 1300 (step S1205). The read image data of the color chart 1300 is stored in the image memory 204 through the image processor 203. The CPU 250 reads the read brightnesses of the color patches of the color chart 1300 stored in the image memory 204, and stores the read brightnesses in the memory 251.

On the basis of the read brightnesses of the color patches stored in the memory 251, the CPU 250 calculates, for individual color components (red, green, and blue), the averages of the read brightnesses of the color patches in the main-scanning direction (left, center, and right), and stores the obtained averages in the memory 251 (step S1206).

Figure 14:
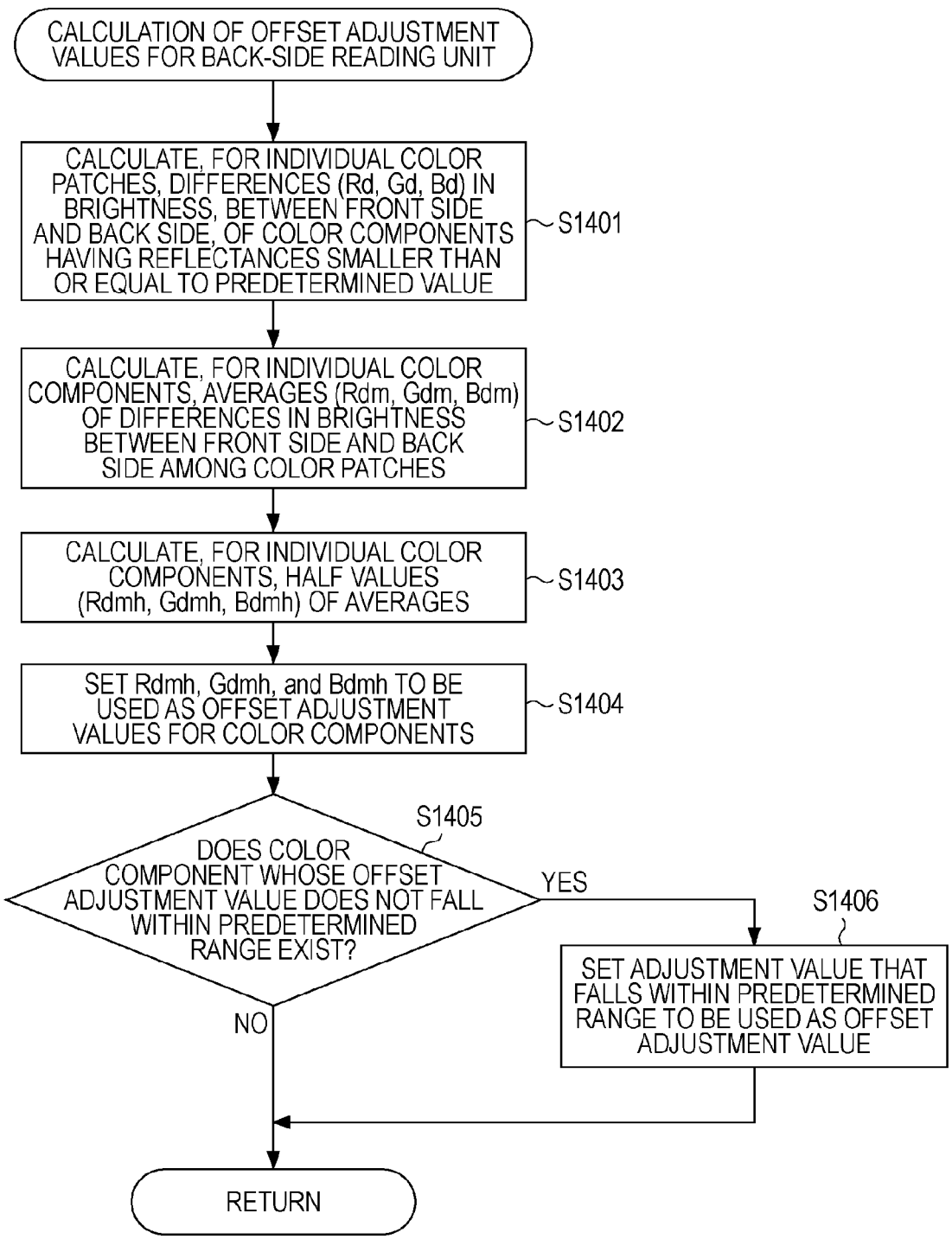
FIG. 14 is a flowchart showing processing for calculating offset correction values for the back-side reading unit.

Then, the CPU 250 calculates offset adjustment values for the CIS 128 (the back-side reading unit, that is, the second reading unit) (step S1207). FIG. 14, described below, illustrates details of step S1207. The CPU 250 sets the offset adjustment values (intercept adjustment values) for the shading correction values for the CIS 128 in the image processor 203 (step S1208). Processing then returns to FIG. 3.

Calculation of the offset adjustment values for the CIS 128 (the back-side reading unit) to be performed in step S1207 will now be described with reference to a flowchart shown in FIG. 14. First, the CPU 250 reads, for individual color components, the averages of the color patches (reference color images) stored in the memory 251. The CPU 250 calculates, for individual color patches, differences (Rd, Gd, and Bd) in brightness, between the front side and the back side, of color components having reflectances smaller than or equal to a predetermined value (that is, a brightness of 20) (step S1401). For example, in a case where the maximum read brightness is 255, regarding the read brightnesses of a red patch in the color chart 1300 shown in FIG. 13, the read brightness of red is approximately 190, the read brightness of green is approximately 13, and the read brightness of blue is approximately 12. Thus, the read brightness of red is significantly large, whereas the read brightnesses of green and blue are very small. In addition, regarding the read brightnesses of a blue patch in the color chart 1300, the read brightness of red is approximately 15, the read brightness of green is approximately 13, and the read brightness of blue is approximately 48. Thus, the read brightness of blue is large, whereas the read brightnesses of red and green are small. In step S1401, differences in brightness, between the front and back sides, of color components having small read brightnesses are calculated. That is, for example, as shown in FIG. 15B, regarding a red patch, differences in brightness, between the front side and the back side, of green and blue components are calculated. Similarly, regarding other color patches, differences in brightness, between the front side and the back side, of color components having small spectral reflectances are calculated.

Then, as shown in FIG. 15C, the CPU 250 calculates, for individual color components, the averages (Rdm, Gdm, and Bdm) of differences in brightness between the front and back sides among color patches (reference color images) (step S1402), and calculates the half values (Rdmh, Gdmh, and Bdmh) of the averages (step S1403). Then, the CPU 250 sets the values Rdmh, Gdmh, and Bdmh to be used as offset adjustment values for the color components (step S1404). The half values of the averages of the differences in brightness between the front side and the back side are obtained in step S1403 because if offset adjustment of the linearity characteristic of the back-side reading unit is performed simply using Rdm, Gdm, and Bdm, a difference between color read by the front side and color read by the back side may occur in the case that a monochrome image is read. Thus, by performing offset adjustment using the values Rdmh, Gdmh, and Bdmh, an influence to be exerted on a difference in color between the front and back sides in the case of a monochrome image (gray image) can be reduced and a difference in brightness between the front and back sides in the case of a color image can be reduced. However, in a case where, even if half values of the averages of the differences in brightness between the front side and the back side are not obtained, no influence is exerted on a difference in color between the front and back sides when a monochrome image is read, the half values are not necessarily obtained.

The CPU 250 determines whether a color component whose offset adjustment value determined in step S1404 does not fall within a predetermined range (from −2.0 to +2.0) exists (step S1405). If it is determined in step S1405 that a color component whose offset adjustment value does not fall within the predetermined range exists (YES in step S1405), the corresponding offset adjustment value is replaced for a value defining the predetermined range (step S1406), as shown in FIG. 15C. Then, the process returns to step S1208 of FIG. 12. That is, in the case that the offset adjustment value is smaller than −2.0, the offset adjustment value is set to −2.0. In the case that the offset adjustment value is larger than +2.0, the offset adjustment value is set to +2.0. This is because since excess offset adjustment may disrupt the overall color balance, limitation is provided. However, in a case where an influence is not exerted on a difference in color between the front side and the back side when a monochrome image is read, limitation may not be provided. If it is determined in step S1405 that a color component whose offset adjustment value does not fall within the predetermined range does not exist (NO in step S1405), the process returns to step S1208 of FIG. 12.

FIGS. 16A and 16B show read brightnesses and differences in brightness between the front side and the back side after adjustment for the front and back sides (offset adjustment) is performed using a color chart. As is clear from FIGS.

16A and 16B, a difference in brightness, between the front side and the back side, in a low-brightness range is reduced.

Figure 17:
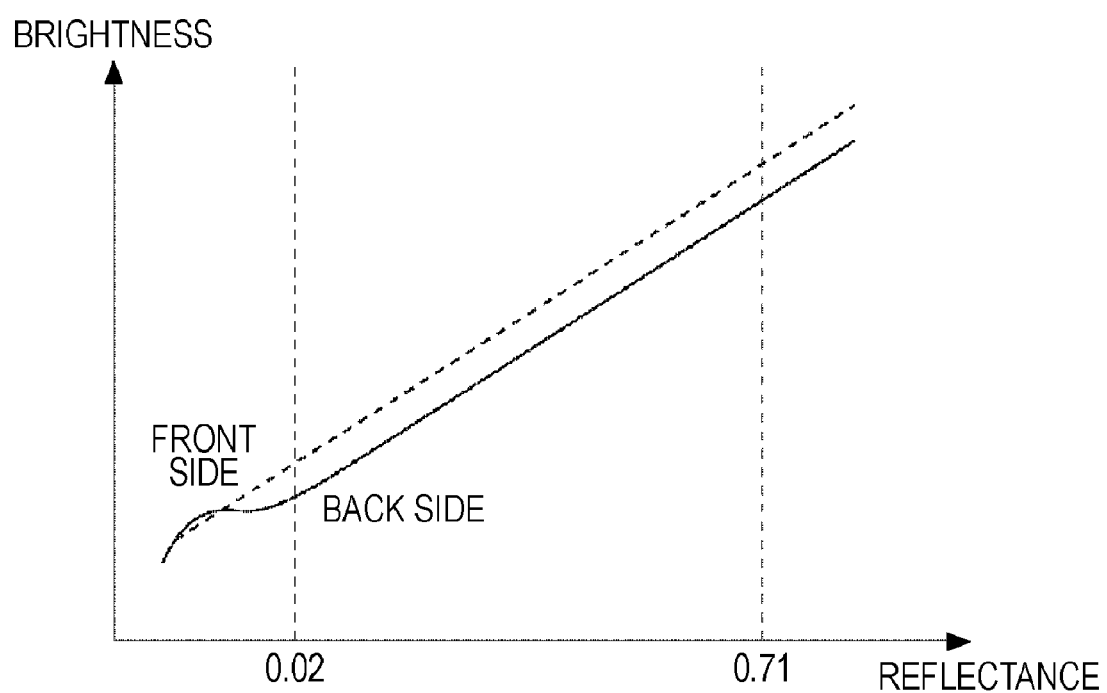
FIG. 17 shows the linearity characteristic of the front-side reading unit and the linearity characteristic of the back-side reading unit after adjustment for the front and back sides using the color chart is performed.

FIG. 17 shows the input-output characteristic of the front-side reading unit and the input-output characteristic of the back-side reading unit obtained after adjustment for the front and back sides using a gray chart and adjustment for the front and back sides using a color chart are performed. Although, on the whole, the input-output characteristic of the front side is slightly different from the input-output characteristic of the back side, a color difference and a brightness difference between the front side and the back side in a low-reflectance portion where a difference originally tends to be noticeable are reduced.

Manual adjustment to be performed in step S305 of FIG. 3 will now be described with reference to a flowchart shown in FIG. 18. First, the CPU 250 identifies a color component that is designated, by an operation unit 150, to be subjected to manual adjustment (step S1801). Then, the CPU 250 determines whether an offset is designated to be increased (step S1802). If it is determined in step S1802 that the offset is designated to be increased (Yes in step S1802), it is determined whether the offset adjustment value is above a predetermined range (step S1803). If it is determined in step S1803 that the offset adjustment value falls within the predetermined range (No in S1803), the CPU 250 performs adjustment for increasing the offset for the shading correction value for the designated color component (step S1804). If it is determined in step S1802 that the offset is not designated to be increased (NO in step S1802), it is determined whether the offset is designated to be decreased (step S1805). If it is determined in step S1805 that the offset is designated to be decreased (YES in step S1805), it is determined whether the offset adjustment value is below the predetermined range (step S1806). If it is determined in step S1806 that the offset adjustment value falls within the predetermined value (NO in step S1806), the CPU 250 performs adjustment for decreasing the offset for the shading correction value for the designated color component (step S1807). After the above-described processing is completed, the process returns to step S305 of FIG. 3. Color difference adjustment between the front side and the back side can be easily performed by the above-described manual adjustment without using a color chart.

Although the linearity characteristic of the back-side reading unit is adjusted so as to match with the linearity characteristic of the front-side reading unit in the above-described embodiment, the linearity characteristic of the front-side reading unit may be adjusted so as to match with the linearity characteristic of the back-side reading unit. Alternatively, both the linearity characteristic of the front-side reading unit and the back-side reading unit may be adjusted such that the linearity characteristic of the front-side reading unit and the linearity characteristic of the back-side reading unit are matched. Accordingly, the relative relationship of the tone characteristic between the front-side reading unit and the back-side reading unit when a gray chart and a color chart are read can be corrected.

In addition, although the image reading device performs adjustment for the front and back sides in the above-described embodiment, such adjustment for the front and back sides may be performed by a personal computer or an image forming device connected to the image reading device. In this case, the image forming device or the personal computer is provided with functions equivalent to those of the image processors 203 and 213. The image forming device or the personal computer receives image data of a chart read by the image reading device, and performs processing relating to the above-described calculation and adjustment on the basis of the image data. A program for executing such processing is stored in a storage medium, such as a hard disk or a compact disc read-only memory (CD-ROM). The program is read and executed by a CPU of the image forming device or the personal computer.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-145451 filed May 31, 2007, which is hereby incorporated by reference herein in its entirety.

What is claimed is:

1. A reading-characteristic correction method for an image reading device including a first reading unit configured to read one side of an original and a second reading unit configured to read the other side of the original, the reading-characteristic correction method comprising:
   causing the first reading unit and the second reading unit to read a monochrome reference original, and
   correcting gain and offset of a tone characteristic of the second reading unit, based on image data of the monochrome reference original read by the first reading unit and the second reading unit, such that the tone characteristic of the second reading unit matches a tone characteristic of the first reading unit;
   causing the first reading unit and the second reading unit to read a color reference original, and
   correcting, for individual color components, the offset of the tone characteristic of the second reading unit, based on image data of the color reference original read by the first reading unit and the second reading unit, such that differences between color read by the first reading unit and color read by the second reading unit are reduced.

2. An image reading device comprising:
   a first reading unit configured to read one side of an original;
   a second reading unit configured to read the other side of the original; and
   a correcting unit configured to correct, for individual color components, slope and intercept of a tone characteristic of the second reading unit,
   wherein after correcting the slope and the intercept of the tone characteristic of the second reading unit, based on image data of a monochrome reference original read by the first reading unit and the second reading unit, such that the tone characteristic of the second reading unit matches a tone characteristic of the first reading unit, the correcting unit corrects, for individual color components, the intercept of the tone characteristic of the second reading unit, based on image data of a color reference original read by the first reading unit and the second reading unit, such that differences between color read by the first reading unit and color read by the second reading unit are reduced.

3. The image reading device according to claim 2, wherein, based on the image data of the monochrome reference original read by the first reading unit and the second reading unit, the correcting unit adjusts the slope and the intercept of the tone characteristic of the second reading unit so as to match with slope and intercept of the tone characteristic of the first reading unit.

4. The image reading device according to claim 2, wherein the monochrome reference original includes a plurality of grayscale images having at least two different reflectances, and the correcting unit linearly approximates the tone characteristic of the first reading unit and the tone characteristic of the second reading unit based on image data of the grayscale images of the two different reflectances read by the first reading unit and the second reading unit.

5. The image reading device according to claim 4, wherein the tone characteristic of the first reading unit and the tone characteristic of the second reading unit within a range between the two different reflectances are not nonlinear and can be expressed by linear approximation.

6. The image reading device according to claim 2, wherein the color reference original includes reference color images of a plurality of colors, and the correcting unit corrects, for individual color components, the intercept of the tone characteristic of the second reading unit based on front-back brightness differences in color components that have reflectances smaller than or equal to a predetermined value from among color components of the reference color images of the color reference original read by the first reading unit and the second reading unit.

7. The image reading device according to claim 6, wherein the correcting unit corrects, for individual color components, the intercept of the tone characteristic of the second reading unit based on averages, among the reference color images, of the front-back brightness differences in the color components that have the reflectances smaller than or equal to the predetermined value.

8. The image reading device according to claim 6, wherein the correcting unit corrects, for individual color components, the intercept of the tone characteristic of the second reading unit based on values obtained by halving averages, among the reference color images, of the front-back brightness differences in the color components that have the reflectances smaller than or equal to the predetermined value.

9. The image reading device according to claim 8, wherein in the case that the values obtained by halving the averages, among the reference color images, of the front-back brightness differences in the color components that have the reflectances smaller than or equal to the predetermined value, does not fall within a predetermined range, the correcting unit corrects, for individual color components, the intercept of the tone characteristic of the second reading unit based on the maximum value within the predetermined range.

10. The image reading device according to claim 2, wherein the monochrome reference original includes grayscale patches of a plurality of halftones, and the color reference original includes color patches of a plurality of colors.

11. The image reading device according to claim 2, wherein the first reading unit includes a reduction optical system, and the second reading unit includes an equal-magnification optical system.

12. The image reading device according to claim 2, further comprising an operation unit configured to designate correction values for the intercept of the tone characteristic of the second reading unit, wherein the correcting unit corrects, for individual color components, the intercept of the tone characteristic of the second reading unit in accordance with designation by the operation unit.

13. An image reading device comprising:
a first reading unit configured to read one side of an original;
a second reading unit configured to read the other side of the original; and
a correcting unit configured to correct, for individual color components, gain and offset of a tone characteristic of the second reading unit,
wherein after correcting the gain and the offset of the tone characteristic of the second reading unit, based on image data of a monochrome reference original read by the first reading unit and the second reading unit, such that the tone characteristic of the second reading unit matches a tone characteristic of the first reading unit, the correcting unit corrects, for individual color components, the offset of the tone characteristic of the second reading unit, based on image data of a color reference original read by the first reading unit and the second reading unit, such that differences between color read by the first reading unit and color read by the second reading unit are reduced.

14. A reading-characteristic correction method for an image reading device including a first reading unit configured to read one side of an original and a second reading unit configured to read the other side of the original, the reading-characteristic correction method comprising:
causing the first reading unit and the second reading unit to read a monochrome reference original;
correcting slope and intercept of a tone characteristic of the second reading unit, based on image data of the monochrome reference original read by the first reading unit and the second reading unit, such that the tone characteristic of the second reading unit matches a tone characteristic of the first reading unit;
causing the first reading unit and the second reading unit to read a color reference original; and
correcting, for individual color components, the intercept of the tone characteristic of the second reading unit, based on image data of the color reference original read by the first reading unit and the second reading unit, such that differences between color read by the first reading unit and color read by the second reading unit are reduced.

* * * * *